US008195918B2

(12) United States Patent
Jeddeloh

(10) Patent No.: US 8,195,918 B2
(45) Date of Patent: *Jun. 5, 2012

(54) MEMORY HUB WITH INTERNAL CACHE AND/OR MEMORY ACCESS PREDICTION

(75) Inventor: Joseph M. Jeddeloh, Shoreview, MN (US)

(73) Assignee: Round Rock Research, LLC, Mt. Kisco, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/108,405

(22) Filed: May 16, 2011

(65) Prior Publication Data

US 2011/0219196 A1 Sep. 8, 2011

Related U.S. Application Data

(63) Continuation of application No. 12/352,053, filed on Jan. 12, 2009, now Pat. No. 7,945,737, which is a continuation of application No. 11/592,041, filed on Nov. 1, 2006, now Pat. No. 7,644,253, which is a continuation of application No. 10/165,787, filed on Jun. 7, 2002, now Pat. No. 7,133,972.

(51) Int. Cl.
*G06F 12/08* (2006.01)
*G06F 13/16* (2006.01)
(52) U.S. Cl. .. 711/213; 711/137; 711/154; 711/E12.057
(58) Field of Classification Search .................. 711/137, 711/154, 118, 213, 145, 112, 114, 113, E12.001, 711/E12.057; 710/22, 3, 100; 709/229, 250, 709/233, 104
See application file for complete search history.

(56) References Cited

U.S. PATENT DOCUMENTS

| 3,742,253 | A | 6/1973 | Kronies |
| 4,045,781 | A | 8/1977 | Levy et al. |
| 4,240,143 | A | 12/1980 | Besemer et al. |
| 4,245,306 | A | 1/1981 | Besemer et al. |
| 4,253,144 | A | 2/1981 | Bellamy et al. |
| 4,253,146 | A | 2/1981 | Bellamy et al. |
| 4,608,702 | A | 8/1986 | Hirzel et al. |

(Continued)

FOREIGN PATENT DOCUMENTS

EP 0849685 A2 6/1998

(Continued)

OTHER PUBLICATIONS

"Free On-Line Dictionary of Computing" entry 'Flash Erasable Programmable Read-Only Memory, online May 17, 2004 [http://foldoc.doc.ic.ac.uk/foldoc/foldoc.cgi?flash+memory].

(Continued)

*Primary Examiner* — Pierre-Michel Bataille
(74) *Attorney, Agent, or Firm* — Lerner, David, Littenberg, Krumholz & Mentlik, LLP

(57) ABSTRACT

A computer system includes a memory hub for coupling a processor to a plurality of synchronous dynamic random access memory ("SDRAM") devices. The memory hub includes a processor interface coupled to the processor and a plurality of memory interfaces coupled to respective SDRAM devices. The processor interface is coupled to the memory interfaces by a switch. Each of the memory interfaces includes a memory controller, a cache memory, and a prediction unit. The cache memory stores data recently read from or written to the respective SDRAM device so that it can be subsequently read by processor with relatively little latency. The prediction unit prefetches data from an address from which a read access is likely based on a previously accessed address.

6 Claims, 3 Drawing Sheets

U.S. PATENT DOCUMENTS

| | | |
|---|---|---|
| 4,707,823 A | 11/1987 | Holdren et al. |
| 4,724,520 A | 2/1988 | Athanas et al. |
| 4,831,520 A | 5/1989 | Rubinfeld et al. |
| 4,891,808 A | 1/1990 | Williams |
| 4,930,128 A | 5/1990 | Suzuki et al. |
| 4,953,930 A | 9/1990 | Ramsey et al. |
| 5,133,059 A | 7/1992 | Ziegler et al. |
| 5,241,506 A | 8/1993 | Motegi et al. |
| 5,243,703 A | 9/1993 | Farmwald et al. |
| 5,251,303 A | 10/1993 | Fogg, Jr. et al. |
| 5,269,022 A | 12/1993 | Shinjo et al. |
| 5,313,590 A | 5/1994 | Taylor |
| 5,317,752 A | 5/1994 | Jewett et al. |
| 5,319,755 A | 6/1994 | Farmwald et al. |
| 5,327,553 A | 7/1994 | Jewett et al. |
| 5,355,391 A | 10/1994 | Horowitz et al. |
| 5,432,823 A | 7/1995 | Gasbarro et al. |
| 5,432,907 A | 7/1995 | Picazo, Jr. et al. |
| 5,442,770 A | 8/1995 | Barratt |
| 5,461,627 A | 10/1995 | Rypinski |
| 5,465,229 A | 11/1995 | Bechtolsheim et al. |
| 5,465,343 A | 11/1995 | Henson et al. |
| 5,479,370 A | 12/1995 | Furuyama et al. |
| 5,497,476 A | 3/1996 | Oldfield et al. |
| 5,502,621 A | 3/1996 | Schumacher et al. |
| 5,544,319 A | 8/1996 | Acton et al. |
| 5,566,325 A | 10/1996 | Bruce, II et al. |
| 5,577,220 A | 11/1996 | Combs et al. |
| 5,581,767 A | 12/1996 | Katsuki et al. |
| 5,606,717 A | 2/1997 | Farmwald et al. |
| 5,619,670 A | 4/1997 | Shindo |
| 5,638,334 A | 6/1997 | Farmwald et al. |
| 5,638,534 A | 6/1997 | Mote, Jr. |
| 5,659,713 A | 8/1997 | Goodwin et al. |
| 5,659,798 A | 8/1997 | Blumrich et al. |
| 5,687,325 A | 11/1997 | Chang |
| 5,706,224 A | 1/1998 | Srinivasan et al. |
| 5,710,733 A | 1/1998 | Chengson et al. |
| 5,715,456 A | 2/1998 | Bennett et al. |
| 5,729,709 A | 3/1998 | Harness |
| 5,748,616 A | 5/1998 | Riley |
| 5,796,413 A | 8/1998 | Shipp et al. |
| 5,818,844 A | 10/1998 | Singh et al. |
| 5,819,304 A | 10/1998 | Nilsen et al. |
| 5,822,255 A | 10/1998 | Uchida |
| 5,832,250 A | 11/1998 | Whittaker |
| 5,838,931 A | 11/1998 | Regenold et al. |
| 5,875,352 A | 2/1999 | Gentry et al. |
| 5,875,454 A | 2/1999 | Craft et al. |
| 5,887,159 A | 3/1999 | Burrows |
| 5,928,343 A | 7/1999 | Farmwald et al. |
| 5,966,724 A | 10/1999 | Ryan |
| 5,973,935 A | 10/1999 | Schoenfeld et al. |
| 5,973,951 A | 10/1999 | Bechtolsheim et al. |
| 5,978,567 A | 11/1999 | Rebane et al. |
| 5,987,196 A | 11/1999 | Noble |
| 6,006,340 A | 12/1999 | O'Connell |
| 6,011,741 A | 1/2000 | Wallace et al. |
| 6,023,726 A | 2/2000 | Saksena |
| 6,029,250 A | 2/2000 | Keeth |
| 6,031,241 A | 2/2000 | Silfvast et al. |
| 6,033,951 A | 3/2000 | Chao |
| 6,038,630 A | 3/2000 | Foster et al. |
| 6,061,263 A | 5/2000 | Boaz et al. |
| 6,061,296 A | 5/2000 | Ternullo, Jr. et al. |
| 6,067,262 A | 5/2000 | Irrinki et al. |
| 6,067,649 A | 5/2000 | Goodwin |
| 6,073,190 A | 6/2000 | Rooney |
| 6,076,139 A | 6/2000 | Welker et al. |
| 6,079,008 A | 6/2000 | Clery, III |
| 6,092,158 A | 7/2000 | Harriman et al. |
| 6,098,158 A | 8/2000 | Lay et al. |
| 6,105,075 A | 8/2000 | Ghaffari |
| 6,125,431 A | 9/2000 | Kobayashi |
| 6,128,703 A | 10/2000 | Bourekas et al. |
| 6,131,149 A | 10/2000 | Lu et al. |
| 6,134,624 A | 10/2000 | Burns et al. |
| 6,137,709 A | 10/2000 | Boaz et al. |
| 6,144,587 A | 11/2000 | Yoshida |
| 6,145,033 A | 11/2000 | Chee |
| 6,157,962 A | 12/2000 | Hodges et al. |
| 6,167,465 A | 12/2000 | Parvin et al. |
| 6,167,486 A | 12/2000 | Lee et al. |
| 6,175,571 B1 | 1/2001 | Haddock et al. |
| 6,185,352 B1 | 2/2001 | Hurley |
| 6,185,676 B1 | 2/2001 | Poplingher et al. |
| 6,186,400 B1 | 2/2001 | Dvorkis et al. |
| 6,191,663 B1 | 2/2001 | Hannah |
| 6,201,724 B1 | 3/2001 | Ishizaki et al. |
| 6,208,180 B1 | 3/2001 | Fisch et al. |
| 6,212,590 B1 | 4/2001 | Melo et al. |
| 6,216,219 B1 | 4/2001 | Cai et al. |
| 6,219,725 B1 | 4/2001 | Diehl et al. |
| 6,223,301 B1 | 4/2001 | Santeler et al. |
| 6,233,376 B1 | 5/2001 | Updegrove |
| 6,243,769 B1 | 6/2001 | Rooney |
| 6,243,831 B1 | 6/2001 | Mustafa et al. |
| 6,246,618 B1 | 6/2001 | Yamamoto et al. |
| 6,247,107 B1 | 6/2001 | Christie |
| 6,249,802 B1 | 6/2001 | Richardson et al. |
| 6,252,821 B1 | 6/2001 | Nizar et al. |
| 6,256,692 B1 | 7/2001 | Yoda et al. |
| 6,272,609 B1 | 8/2001 | Jeddeloh |
| 6,285,349 B1 | 9/2001 | Smith |
| 6,286,083 B1 | 9/2001 | Chin et al. |
| 6,294,937 B1 | 9/2001 | Crafts et al. |
| 6,301,637 B1 | 10/2001 | Krull et al. |
| 6,327,642 B1 | 12/2001 | Lee et al. |
| 6,330,205 B2 | 12/2001 | Shimizu et al. |
| 6,330,639 B1 | 12/2001 | Fanning et al. |
| 6,347,055 B1 | 2/2002 | Motomura |
| 6,349,363 B2 | 2/2002 | Cai et al. |
| 6,356,573 B1 | 3/2002 | Jonsson et al. |
| 6,367,074 B1 | 4/2002 | Bates et al. |
| 6,370,068 B2 | 4/2002 | Rhee |
| 6,370,611 B1 | 4/2002 | Callison et al. |
| 6,373,777 B1 | 4/2002 | Suzuki |
| 6,381,190 B1 | 4/2002 | Shinkai |
| 6,389,514 B1 | 5/2002 | Rokicki |
| 6,392,653 B1 | 5/2002 | Malandain et al. |
| 6,401,213 B1 | 6/2002 | Jeddeloh |
| 6,405,280 B1 | 6/2002 | Ryan |
| 6,421,744 B1 | 7/2002 | Morrison et al. |
| 6,430,696 B1 | 8/2002 | Keeth |
| 6,433,785 B1 | 8/2002 | Garcia et al. |
| 6,434,639 B1 | 8/2002 | Haghighi |
| 6,434,696 B1 | 8/2002 | Kang |
| 6,434,736 B1 | 8/2002 | Schaecher et al. |
| 6,438,622 B1 | 8/2002 | Haghighi et al. |
| 6,438,668 B1 | 8/2002 | Esfahani et al. |
| 6,449,308 B1 | 9/2002 | Knight, Jr. et al. |
| 6,453,393 B1 | 9/2002 | Holman et al. |
| 6,460,108 B1 | 10/2002 | McCoskey et al. |
| 6,460,114 B1 | 10/2002 | Jeddeloh |
| 6,462,978 B2 | 10/2002 | Shibata et al. |
| 6,463,059 B1 | 10/2002 | Movshovich et al. |
| 6,467,013 B1 | 10/2002 | Nizar |
| 6,470,422 B2 | 10/2002 | Cai et al. |
| 6,473,828 B1 | 10/2002 | Matsui |
| 6,477,592 B1 | 11/2002 | Chen et al. |
| 6,477,614 B1 | 11/2002 | Leddige et al. |
| 6,477,621 B1 | 11/2002 | Lee et al. |
| 6,479,322 B2 | 11/2002 | Kawata et al. |
| 6,487,556 B1 | 11/2002 | Downs et al. |
| 6,490,188 B2 | 12/2002 | Nuxoll et al. |
| 6,493,803 B1 | 12/2002 | Pham et al. |
| 6,496,193 B1 | 12/2002 | Surti et al. |
| 6,496,909 B1 | 12/2002 | Schimmel |
| 6,501,471 B1 | 12/2002 | Venkataraman et al. |
| 6,502,161 B1 | 12/2002 | Perego et al. |
| 6,505,287 B2 | 1/2003 | Uematsu |
| 6,523,092 B1 | 2/2003 | Fanning |
| 6,523,093 B1 | 2/2003 | Bogin et al. |
| 6,526,483 B1 | 2/2003 | Cho et al. |

| | | | | | | |
|---|---|---|---|---|---|---|
| 6,539,490 B1 | 3/2003 | Forbes et al. | | 2002/0112119 A1 | 8/2002 | Halbert et al. |
| 6,552,564 B1 | 4/2003 | Forbes et al. | | 2002/0116588 A1 | 8/2002 | Beckert et al. |
| 6,553,476 B1 | 4/2003 | Ayaki et al. | | 2002/0120709 A1 | 8/2002 | Chow et al. |
| 6,564,329 B1 | 5/2003 | Cheung et al. | | 2002/0144064 A1 | 10/2002 | Fanning |
| 6,587,912 B2 | 7/2003 | Leddige et al. | | 2002/0178319 A1 | 11/2002 | Sanchez-Olea |
| 6,590,816 B2 | 7/2003 | Perner | | 2003/0005223 A1 | 1/2003 | Coulson et al. |
| 6,594,713 B1 | 7/2003 | Fuoco et al. | | 2003/0014578 A1 | 1/2003 | Pax |
| 6,594,722 B1 | 7/2003 | Willke, II et al. | | 2003/0043158 A1 | 3/2003 | Wasserman et al. |
| 6,598,154 B1 | 7/2003 | Vaid et al. | | 2003/0043426 A1 | 3/2003 | Baker et al. |
| 6,615,325 B2 | 9/2003 | Mailloux et al. | | 2003/0093630 A1 | 5/2003 | Richard et al. |
| 6,622,227 B2 | 9/2003 | Zumkehr et al. | | 2003/0149809 A1 | 8/2003 | Jensen et al. |
| 6,628,294 B1 | 9/2003 | Sadowsky et al. | | 2003/0156639 A1 | 8/2003 | Liang |
| 6,629,220 B1 | 9/2003 | Dyer | | 2003/0158995 A1 | 8/2003 | Lee et al. |
| 6,631,440 B2 | 10/2003 | Jenne et al. | | 2003/0163649 A1 | 8/2003 | Kapur et al. |
| 6,636,110 B1 | 10/2003 | Ooishi et al. | | 2003/0177320 A1 | 9/2003 | Sah et al. |
| 6,646,929 B1 | 11/2003 | Moss et al. | | 2003/0193927 A1 | 10/2003 | Hronik |
| 6,647,470 B1 | 11/2003 | Janzen | | 2003/0217223 A1 | 11/2003 | Nino et al. |
| 6,658,509 B1 | 12/2003 | Bonella et al. | | 2003/0223295 A1 | 12/2003 | Ozguz et al. |
| 6,662,304 B2 | 12/2003 | Keeth et al. | | 2003/0227798 A1 | 12/2003 | Pax |
| 6,665,202 B2 | 12/2003 | Lindahl et al. | | 2003/0229762 A1 | 12/2003 | Maiyuran et al. |
| 6,667,895 B2 | 12/2003 | Jang et al. | | 2003/0229770 A1 | 12/2003 | Jeddeloh |
| 6,681,292 B2 | 1/2004 | Creta et al. | | 2003/0235072 A1 | 12/2003 | Kim et al. |
| 6,697,926 B2 | 2/2004 | Johnson et al. | | 2004/0006671 A1 | 1/2004 | Handgen et al. |
| 6,704,817 B1 | 3/2004 | Steinman et al. | | 2004/0015666 A1 | 1/2004 | Rojas et al. |
| 6,715,018 B2 | 3/2004 | Farnworth et al. | | 2004/0019728 A1 | 1/2004 | Sharma |
| 6,718,440 B2 | 4/2004 | Maiyuran et al. | | 2004/0022094 A1 | 2/2004 | Radhakrishnan et al. |
| 6,721,195 B2 | 4/2004 | Brunelle et al. | | 2004/0024959 A1 | 2/2004 | Taylor |
| 6,724,685 B2 | 4/2004 | Braun et al. | | 2004/0024978 A1 | 2/2004 | Jeddeloh |
| 6,728,800 B1 | 4/2004 | Lee et al. | | 2004/0034753 A1 | 2/2004 | Jeddeloh |
| 6,735,679 B1 | 5/2004 | Herbst et al. | | 2004/0039886 A1 | 2/2004 | Christofferson et al. |
| 6,735,682 B2 | 5/2004 | Segelken et al. | | 2004/0044833 A1 | 3/2004 | Ryan |
| 6,745,275 B2 | 6/2004 | Chang | | 2004/0049649 A1 | 3/2004 | Durrant |
| 6,751,703 B2 | 6/2004 | Chilton | | 2004/0064602 A1 | 4/2004 | George |
| 6,754,117 B2 | 6/2004 | Jeddeloh | | 2004/0122988 A1 | 6/2004 | Han et al. |
| 6,754,812 B1 | 6/2004 | Abdallah et al. | | 2004/0126115 A1 | 7/2004 | Levy et al. |
| 6,756,661 B2 | 6/2004 | Tsuneda et al. | | 2004/0144994 A1 | 7/2004 | Lee et al. |
| 6,760,833 B1 | 7/2004 | Dowling | | 2004/0158677 A1 | 8/2004 | Dodd |
| 6,771,538 B2 | 8/2004 | Shukuri et al. | | 2004/0170196 A1 | 9/2004 | Susnow |
| 6,775,747 B2 | 8/2004 | Venkatraman | | 2004/0236885 A1 | 11/2004 | Fredriksson et al. |
| 6,782,466 B1 | 8/2004 | Steele et al. | | 2004/0260909 A1 | 12/2004 | Lee et al. |
| 6,785,780 B1 | 8/2004 | Klein et al. | | 2004/0268061 A1 | 12/2004 | Khare et al. |
| 6,788,104 B2 | 9/2004 | Singh et al. | | 2005/0044327 A1 | 2/2005 | Howard et al. |
| 6,789,173 B1 | 9/2004 | Tanaka et al. | | 2005/0060533 A1 | 3/2005 | Woo et al. |
| 6,792,059 B2 | 9/2004 | Yuan et al. | | 2005/0066137 A1 | 3/2005 | Jeddeloh et al. |
| 6,792,496 B2 | 9/2004 | Aboulenein et al. | | 2005/0071542 A1 | 3/2005 | Weber et al. |
| 6,795,899 B2 | 9/2004 | Dodd et al. | | 2005/0078506 A1 | 4/2005 | Rao et al. |
| 6,799,246 B1 | 9/2004 | Wise et al. | | 2005/0105350 A1 | 5/2005 | Zimmerman |
| 6,799,268 B1 | 9/2004 | Boggs et al. | | 2005/0149774 A1 | 7/2005 | Jeddeloh et al. |
| 6,804,760 B2 | 10/2004 | Wiliams | | 2005/0216678 A1 | 9/2005 | Jeddeloh |
| 6,804,764 B2 | 10/2004 | LaBerge et al. | | 2005/0223161 A1 | 10/2005 | Jeddeloh |
| 6,807,630 B2 | 10/2004 | Lay et al. | | 2005/0286506 A1 | 12/2005 | LaBerge |
| 6,811,320 B1 | 11/2004 | Abbott | | 2006/0168407 A1 | 7/2006 | Stern |
| 6,816,947 B1 | 11/2004 | Huffman | | 2006/0200642 A1 | 9/2006 | LaBerge |
| 6,820,181 B2 | 11/2004 | Jeddeloh et al. | | 2006/0206679 A1 | 9/2006 | Jeddeloh et al. |
| 6,821,029 B1 | 11/2004 | Grung et al. | | 2006/0212655 A1 | 9/2006 | Jeddeloh et al. |
| 6,823,023 B1 | 11/2004 | Hannah | | 2006/0212666 A1 | 9/2006 | Jeddeloh |
| 6,829,705 B2 | 12/2004 | Smith | | 2007/0088915 A1 | 4/2007 | Archambault et al. |
| 6,832,303 B2 | 12/2004 | Tanaka | | 2009/0125688 A1 | 5/2009 | Jeddeloh |
| 6,845,409 B1 | 1/2005 | Talagala et al. | | | | |
| 6,889,304 B2 | 5/2005 | Perego et al. | | FOREIGN PATENT DOCUMENTS | | |
| 6,910,109 B2 | 6/2005 | Holman et al. | | EP | 1199637 A2 | 4/2002 |
| 6,928,528 B1 | 8/2005 | Hewitt | | JP | 06004401 A | 1/1994 |
| 6,941,433 B1 | 9/2005 | Libby et al. | | JP | 06028180 A | 2/1994 |
| 6,980,042 B2 | 12/2005 | LaBerge | | JP | 08185383 A | 7/1996 |
| 7,107,415 B2 | 9/2006 | Jeddeloh et al. | | JP | 10228413 A | 8/1998 |
| 7,117,316 B2 | 10/2006 | Jeddeloh | | JP | 2001265539 A | 9/2001 |
| 7,120,727 B2 | 10/2006 | Lee et al. | | KR | 2000-0067533 A | 11/2000 |
| 7,162,567 B2 | 1/2007 | Jeddeloh | | TW | 491970 B | 6/2002 |
| 7,188,219 B2 | 3/2007 | Jeddeloh | | WO | 9318459 A1 | 9/1993 |
| 7,254,075 B2 | 8/2007 | Woo et al. | | WO | 9319422 A1 | 9/1993 |
| 7,315,053 B2 | 1/2008 | Hosomi et al. | | WO | 9704401 A2 | 2/1997 |
| 7,318,130 B2 | 1/2008 | Morrow et al. | | WO | 98/57489 A2 | 12/1998 |
| 7,818,497 B2 * | 10/2010 | Gower et al. ............ 711/105 | | WO | 9923570 A1 | 5/1999 |
| 2001/0039612 A1 | 11/2001 | Lee | | WO | 9934294 A1 | 7/1999 |
| 2002/0002656 A1 | 1/2002 | Honma et al. | | WO | 0026798 A1 | 5/2000 |
| 2002/0078298 A1 | 6/2002 | Jeddeloh | | WO | 0043902 A1 | 7/2000 |
| | | | | WO | 0227499 A2 | 4/2002 |

OTHER PUBLICATIONS

Intel, "Flash Memory PCI Add-In Card for Embedded Systems", Application Note AP-758, Sep. 1997, pp. i-13.

Intel, "Intel 840 Chipset: 82840 Memory Controller Hub (MCH)", Datasheet, www.intel.com/design/chipsets/datashts/298020.htm, Oct. 1999, pp. 1-178.

Micron Technology, Inc., "Synchronous DRAM Module 512MB/1GB (x72, ECC) 168-PIN Registered FBGA SDRAM DIMM", Micron Technology, Inc., 2002, pp. 1-23.

Shanley, T. et al., "PCI System Architecture", Third Edition, Mindshare, Inc., 1995, pp. 24-25.

* cited by examiner

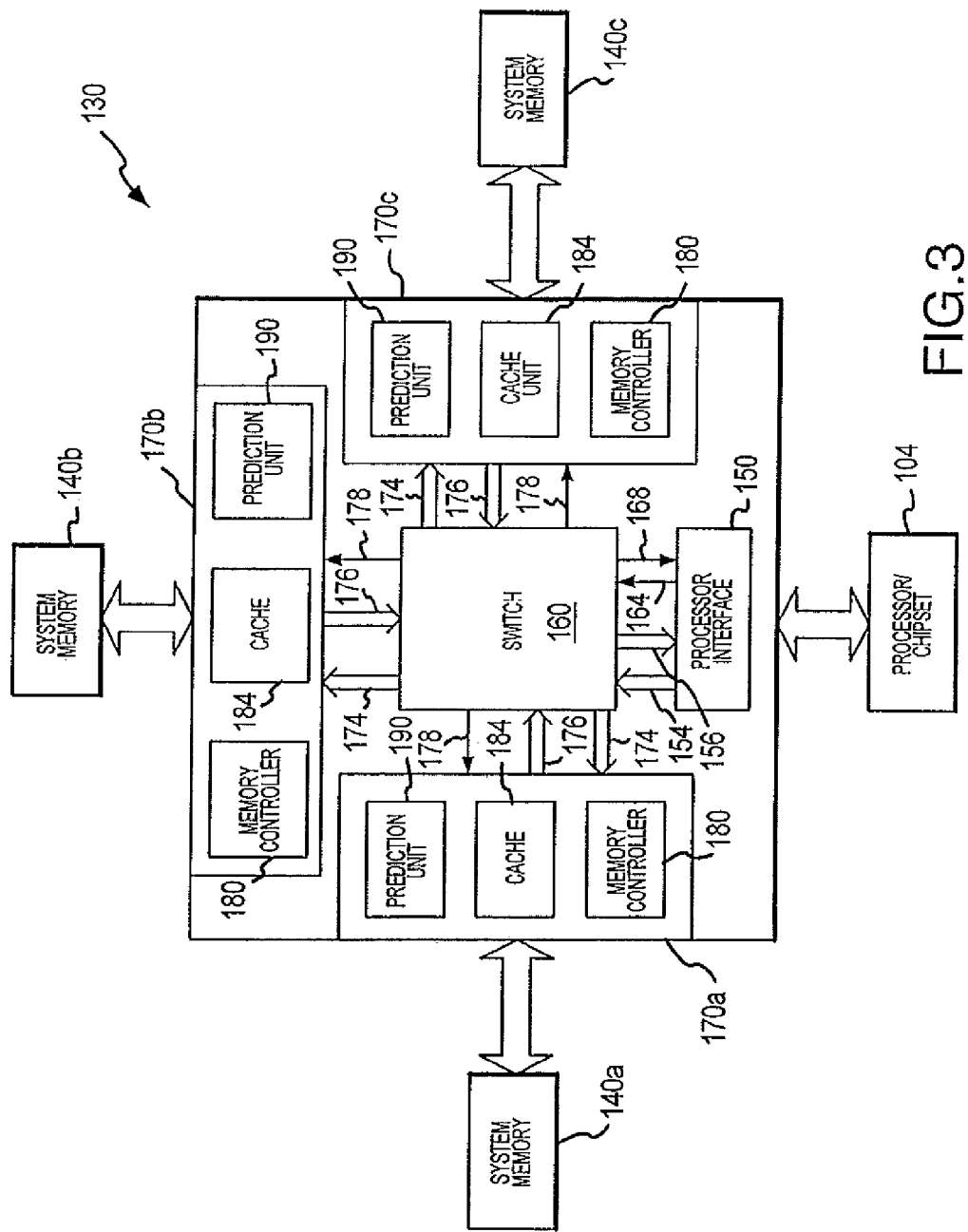

MEMORY HUB WITH INTERNAL CACHE AND/OR MEMORY ACCESS PREDICTION

CROSS-REFERENCE TO RELATED APPLICATIONS

This application is a continuation of U.S. application Ser. No. 12/352,053, filed on Jan. 12, 2009, issued as U.S. Pat. No. 7,945,737, which is a continuation of U.S. patent application Ser. No. 11/592,041, filed on Nov. 1, 2006, and issued as U.S. Pat. No. 7,644,253, which is a continuation of U.S. patent application Ser. No. 10/165,787, filed on Jun. 7, 2002, and issued as U.S. Pat. No. 7,133,972, the disclosures of which are incorporated herein by reference.

TECHNICAL FIELD

This invention relates to computer systems, and, more particularly, to a computer system having a memory hub coupling several memory devices to a processor or other memory access device.

BACKGROUND OF THE INVENTION

Computer systems use memory devices, such as dynamic random access memory ("SDRAM") devices, to store instructions and data that are accessed by a processor. In a typical computer system, the processor communicates with the system memory through a processor bus and a memory controller. The processor issues a command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively low speed of memory controllers and memory devices limits the communication bandwidth between the processor and the memory devices.

In addition to the limited bandwidth between processors and memory devices, the performance of computer systems and is also limited by latency problems that increase the time required to read data from system memory devices. More specifically, when a memory device read command is coupled to a system memory device, such as an asynchronous DRAM ("SDRAM") device, the read data is output from the SDRAM device only after a delay of several clock periods. Therefore, although SDRAM devices can synchronously output burst data at a high data rate, the delay in initially providing the data can significantly slow the operating speed of a computer system using such SDRAM devices.

One approach to alleviating at the memory latency problem is to use multiple memory devices coupled to the processor through a memory hub. Computer systems employing this architecture can have a higher bandwidth because a processor can access one memory device while another memory device is responding to a prior memory access. For example, the processor can output write data to one of the memory devices in the system while another memory device in the system is preparing to provide read data to the processor. However, although computer systems using memory hubs may provide superior performance, they nevertheless often fail to operate at optimum speed. One of the reasons such computer systems fail to operate at optimum speed is that conventional memory hubs are essentially single channel systems since all control, address and data signals must pass through common memory hub circuitry. As a result, when the memory hub circuitry is busy communicating with one memory device, it is not free to communicate with another memory device. Furthermore, although computer systems using memory hubs can provide a greater memory bandwidth, they still suffer from latency problems of the type described above. More specifically, although the processor may communicate with one memory device while another memory device is preparing to transfer data, is sometimes necessary to receive data from one memory device before the data from another memory device can be used. In the event data must be received from one memory device before data received from another memory device can be used, the latency problem continues to slow the operating speed of such computer systems.

There is therefore a need for a computer architecture that provides the advantages of a memory hub architecture and also minimize this latency problems common in such systems, thereby providing a memory devices with high bandwidth and low latency.

BRIEF SUMMARY OF THE INVENTION

A memory hub that may be used in a computer system includes a memory access device interface coupled to a processor or other memory access device, and a plurality of memory interfaces each of which is coupled to a respective memory device. Each of the memory interfaces includes a memory controller and, according to one aspect of the invention, a memory cache. Each of the memory interfaces is coupled to the memory access device interface by a switch. In operation, data read from or written to a memory device coupled to one of the memory interfaces are stored in the cache memory for the memory interface. In response to a subsequent memory read request, the cache memory is checked to determine whether the data corresponding to the memory read request are stored in the cache memory. In the event of a cache hit, the requested data are provided from the cache memory. Otherwise, the requested data are provided by the memory device. According to another aspect of the invention, each memory interface includes a memory controller and a prediction unit. The prediction unit predicts an address from which data are likely to be read based on an address from a prior memory access. The prediction unit then causes the memory controller in the respective memory interface to read data from the predicted address. The memory hub may be physically included in a system controller, a memory module, or some other component of a computer system or other electronic system using memory devices.

BRIEF DESCRIPTION OF THE DRAWINGS

FIG. 3 is a block diagram of a memory hub used in the computer systems of FIGS. 1 and 2.

DETAILED DESCRIPTION

Figure 1:
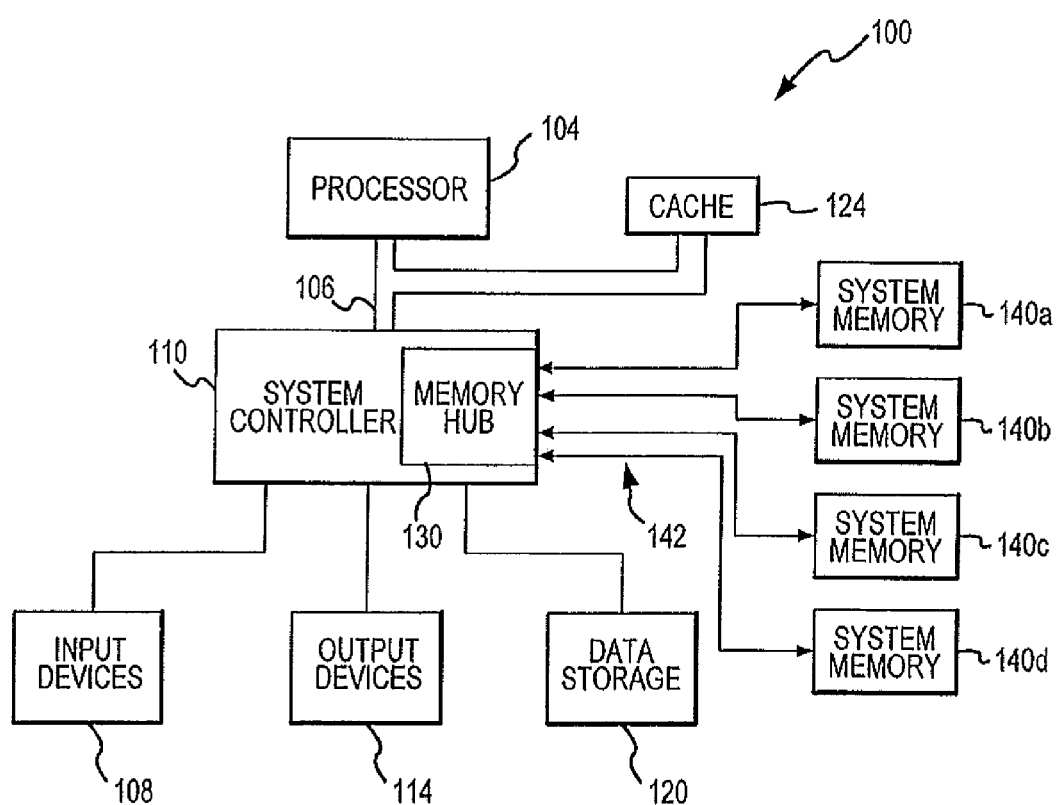
FIG. 1 is a block diagram of a computer system according to one embodiment of the invention in which the memory hub is included in a system controller.

A computer system 100 according to one embodiment of the invention is shown in FIG. 1. The computer system 100 includes a processor 104 for performing various computing functions, such as executing specific software to perform specific calculations or tasks. The processor 104 includes a processor bus 108 that normally includes an address bus, a control bus, and a data bus. In addition, the computer system 100 includes one or more input devices 108, such as a keyboard or a mouse, coupled to the processor 104 through a system controller 110 to allow an operator to interface with the computer system 100. Typically, the computer system 100 also includes one or more output devices 114 coupled to the processor 104 through the system controller 110, such output devices typically being a printer or a video terminal. One or more data storage devices 120 are also typically coupled to the processor 104 through the system controller 110 to allow the processor 104 to store data or retrieve data from internal or external storage media (not shown). Examples of typical storage devices 120 include hard and floppy disks, tape cassettes, and compact disk read-only memories (CD-ROMs). The processor 104 is also typically coupled to cache memory 124, which is usually static random access memory ("SRAM").

The system controller 110 also includes a memory hub 130 for controlling access to several system memory devices 140a-d, each of which may be a synchronous dynamic random access memory ("SDRAM"). The memory hub 130 allows the processor 104 to write data to and read data from each of the system memory devices 140a-d. The memory hub 130 is coupled to each of the system memory devices 140a-d through a bus system 142, which normally includes a control bus, an address bus and a data bus.

Although the memory hub 130 is shown in FIG. 1 coupled to the processor 104, it will be understood that the memory hub 130 may also be coupled to other components in a computer system chipset (not shown) and may also allow other devices (not shown) to write data to and read data from the system memory devices 140a-d in a direct memory operation, as is well known in the art. Also, the memory hub 130 may be physically included as a part of components of an electronic system other than the system controller 110. For example, a computer system 144 shown in FIG. 2 uses most of the same components that are used in the computer system 100 of FIG. 1. In the interest of brevity, such common components have been provided with the same reference numerals, and an explanation of their operation will not be repeated. The computer system 144 differs from the computer system 100 shown in FIG. 1 in that the memory hub 130 is not included in the system controller 110. Instead, the system controller 110 is coupled to a plurality of memory modules 146, such a double in-line memory modules ("DIMMs"). Each of the memory modules 146 includes the memory hub 130 and a plurality of memory devices 148, which may be SDRAM or some other type of memory device. The memory hub 130 operates in essentially the same manner explained above with reference to FIG. 1 to cache data stored in the memory modules 146.

Figure 2:
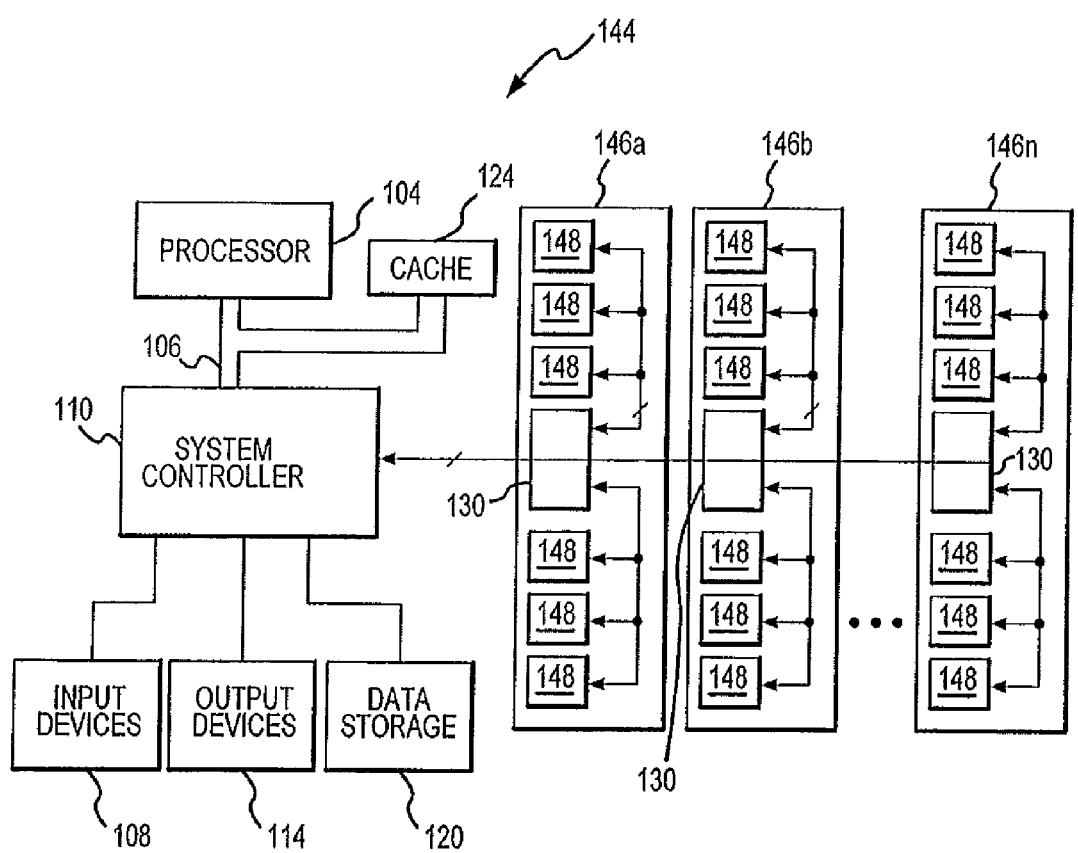
FIG. 2 is a block diagram of a computer system according to another embodiment of the invention in which the memory hub is included in a memory module.

Although FIGS. 1 and 2 show the memory hub 130 included in the system controller 110 and the memory modules 146, respectively, it will be understood that the memory hub 130 may be a stand-alone unit or it may be included in other components of a computer system or other system using memory devices.

One embodiment of the memory hub 130 is shown in FIG. 3 in which the memory hub 130 is coupled to the processor 104 and three memory devices 140a-c, which, in the example illustrated in FIG. 3, are SDRAM devices. The memory hub 130 is shown coupled to the processor 104 in a point-to-point arrangement in which there are no other devices coupled to the connection between the processor 104 and the memory hub 130. This type of interconnection provides better signal coupling between the processor 104 and the memory hub 130 for several reasons, including relatively low capacitance, relatively few line discontinuities to reflect signals and relatively short signal paths. However, a multi-drop interconnection may alternatively be used in which other devices (not shown) are coupled to the interconnection between the processor 104 and the memory hub 130.

The memory hub 130 includes a processor interface 150 that is coupled to the processor 104 through a plurality of bus and signal lines, as is well known in the art. The processor interface 150 is, in turn, coupled to a switch 160 through a plurality of bus and signal lines, including a write data bus 154 and a read data bus 156, although a single bi-directional data bus may alternatively be provided to couple data in both directions between the processor interface 150 and the switch 160. The processor interface 150 is also coupled to switch 160 through a request line 164 and a snoop line 168. A snoop signal coupled from the switch 160 to the processor interface 150 through the snoop line 168 is used to maintain cache consistency, as will be described in greater detail below. A request signal coupled from the processor interface 150 to the switch 160 through the request line 164 provides the switch 160 with information corresponding to a request to transfer data through the switch 160. It will be understood, however, that the processor interface 150 maybe coupled to the switch 160 with a greater or lesser number of buses and signal lines or buses and signal lines different from those illustrated in FIG. 3.

The switch 160 is also coupled to three memory interfaces 170a-c which are, in turn, coupled to the system memory devices 140a-c, respectively. By providing a separate and independent memory interface 170a-c for each system memory device 140a-c, respectively, the memory hub 130 avoids bus or memory bank conflicts that typically occur with single channel memory architectures. The switch 160 is coupled to each memory interface through a plurality of bus and signal lines, including a write data bus 174, read data bus 176 and a request line 178. However, it will be understood that a single bi-directional data bus may alternatively be used instead of a separate write data bus 174 and 5 read data bus 176. Significantly, each memory interface 170a-c is specially adapted to the system memory devices 140a-c to which it is coupled. More specifically, each memory interface 170a-c is specially adapted to provide and receive the specific signals received and generated, respectively, by the system memory device 140a-c to which it is coupled. Also, the memory interfaces 170a-c are capable of operating with system memory devices 10 140a-c operating at different clock frequencies. As a result, the memory interfaces 170a-c isolate the processor 104 from changes that may occur at the interface between the memory hub 130 and memory devices 140a-c coupled to the hub 130, and it provides a more controlled environment to which the memory devices 140a-c may interface.

The switch 160 coupling the processor interface 150 to the memory interfaces 170a-c can be any of a variety of conventional or hereinafter developed switches. For example, the switch 160 may be a cross-bar switch that can simultaneously couple at the processor interface 150 and the memory interfaces 170a-c to each other. The switch 160 can also be a set of multiplexers that do not provide the same level of connectivity as a cross-bar switch but nevertheless can couple the processor interface 150 to each of the memory interfaces

170a-c. The switch 160 may also includes arbitration logic (not shown) to determine which memory accesses should receive priority over other memory accesses. Bus arbitration performing this function is well known to one skilled in the art.

With further reference to FIG. 3, each of the memory interfaces 170a-c includes a respective memory controller 180 and a respective cache memory unit 184. The memory controller 180 performs the same functions as a conventional memory controller by providing control, address and data signals to the system memory device 140a-c to which it is coupled and receiving data signals from the system memory device 140a-c to which it is coupled. The cache memory unit 184 includes the normal components of a cache memory including a tag memory, a data memory and a comparator, as is well known in the art. The memory devices used in the cache memory unit 184 may be either DRAM devices, static random access memory ("SRAM") devices, other types of memory devices, or a combination of all three. Furthermore, any or all of these memory devices as well as the other components used in the cache memory unit 184 may be either embedded or stand-alone devices.

The use of the cache memory unit 184 in each memory interface 170a-c allows the processor 104 to receive data responsive to a read command directed to a respective system memory device 140a-c without waiting for the memory device 140a-c to provide such data in the event that the data was recently read from or written to that memory device 140a-c. The cache memory unit 184 thus reduces the read latency of the system memory devices 140a-c to maximize the memory bandwidth of the computer system. Similarly, the processor 104 can store write data in the cache memory unit 184 and then perform other functions while the memory controller 180 in the same memory interface 170a-c transfers the write data from the cache memory unit 184 to the system memory device 140a-c to which it is coupled.

To further reduce the memory access latency provided by the memory hub 130, each memory interface 170a-c may be provided with a prefetch unit 190. The prefetch unit 190 is able to predict the likely address of a subsequent memory read request using conventional algorithms. The memory controller 180 in the same memory interface 170a-c can then perform the memory access in the background while the processor 104 is either accessing a different system memory device 140 or performing other functions. When the processor 104 subsequently provides a command to the memory hub 130 to read data from the predicted address, the read data will already be present in the cache memory unit 180 and can thus be quickly provided to the processor 104.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A computer system, comprising: a processing unit operable to perform computing functions; a system controller coupled to the processing unit; at least one input device coupled to the processing unit through the system controller; at least one output device coupled to the processing unit through the system controller; at least one data storage device coupled to the processing unit through the system controller; a plurality of memory devices; and a memory hub comprising: a processor interface coupled to the processing unit; a plurality of memory interfaces coupled to the processor interface and to respective ones of the memory devices, a local memory controller coupled to each of the plurality of memory through a memory interface comprising:
   a cache memory;
   a prediction unit configured to predict a memory address of a memory location to access based on memory addresses of previously accessed memory locations; and
   an interface memory controller coupled to the prediction unit and configured to receive the predicted memory address, the interface memory controller further configured to generate command and address signals for accessing the memory location in the respective memory corresponding to the predicted memory address in response to receiving the predicted memory address.

2. The computer system of claim 1, wherein the plurality of memory interfaces further comprise a cache and wherein the memory controller is structured to store the data read from the predicted address in the cache.

3. The computer system of claim 1 wherein the memory hub is physically included in the system controller.

4. The computer system of claim 1 wherein the plurality of memory devices are physically packaged in a memory module, and wherein the memory hub is physically included in the memory module.

5. The computer system of claim 1 wherein each of the memory interfaces operates at the same clock speed.

6. The computer system of claim 1 wherein each of the memory devices comprises a dynamic random access memory device.

* * * * *

UNITED STATES PATENT AND TRADEMARK OFFICE
CERTIFICATE OF CORRECTION

PATENT NO. : 8,195,918 B2  
APPLICATION NO. : 13/108405  
DATED : June 5, 2012  
INVENTOR(S) : Joseph M. Jeddeloh Page 1 of 1

It is certified that error appears in the above-identified patent and that said Letters Patent is hereby corrected as shown below:

On the Title Page, item 57, line 11,
In the Abstract Section, "read by processor" should read -- read by the processor --.

In the Specification
Column 1, line 51, "and is also limited" should read -- is also limited --.
Column 2, line 17, "data, is sometimes" should read -- data, it is sometimes --.
Column 2, line 25, "also minimize this" should read -- also minimizes these --.
Column 2, line 26, "providing a memory devices" should read -- providing a memory device --.
Column 3, line 51, "such a" should read -- such as --.
Column 4, line 30, "maybe coupled" should read -- may be coupled --.
Column 5, line 1, "may also includes" should read -- may also include --.

In the Claims
Column 6, line 21, "plurality of memory" should read -- plurality of memory devices --.

Signed and Sealed this
Twenty-fourth Day of December, 2013

Margaret A. Focarino
*Commissioner for Patents of the United States Patent and Trademark Office*